United States Patent [19]

Petersson et al.

[11] Patent Number: 5,345,890
[45] Date of Patent: Sep. 13, 1994

[54] MILKING CLAW FERRULE APERTURE AND SANITIZING METHODOLOGY

[76] Inventors: Lennart G. Petersson, 229 SE. Main St., Douglas, Mass. 01516; Daniel J. Aneshansley, Cornell University, Dept. of Animal Science, Ithaca, N.Y. 14850

[21] Appl. No.: 749,525

[22] Filed: Aug. 26, 1991

[51] Int. Cl.[5] ............................................. A01J 5/04
[52] U.S. Cl. ................................................. 119/14.54
[58] Field of Search ................ 119/14.37, 14.54, 14.55

[56] References Cited

U.S. PATENT DOCUMENTS

| 1,259,309 | 3/1918 | Somers | 119/14.55 X |
| 3,461,845 | 8/1969 | Peterson | 119/14.54 X |
| 3,643,630 | 2/1972 | Duncan | 119/14.54 X |

FOREIGN PATENT DOCUMENTS 207984  1/1957  Australia ........................ 119/14.54

Primary Examiner—Robert P. Swiatek
Attorney, Agent, or Firm—Blodgett & Blodgett

[57] ABSTRACT

A modified milking machine claw having ferrules or connectors with an aperture in the surface of each ferrule to allow complete sanitation of milk lines and removal of debris from pockets between the ferrule and the tube lumen of short milk tubes.

18 Claims, 10 Drawing Sheets

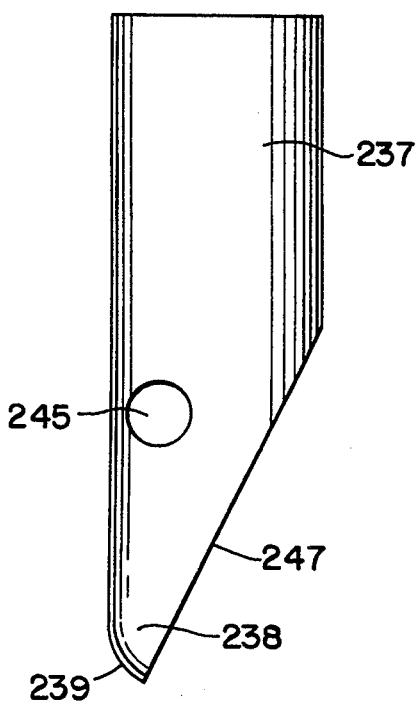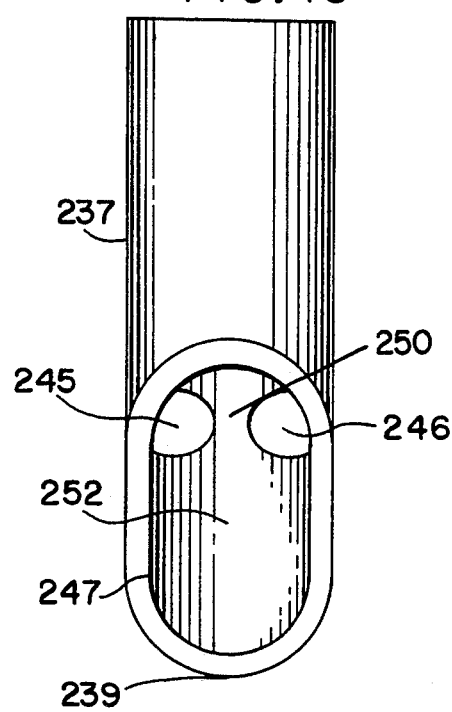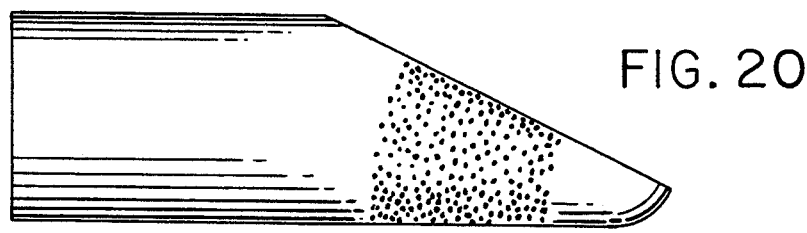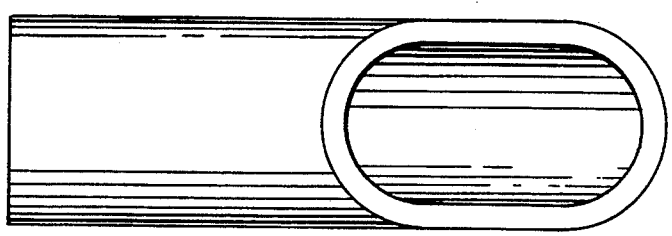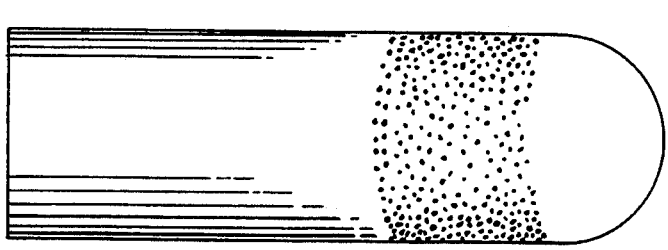

MILKING CLAW FERRULE APERTURE AND SANITIZING METHODOLOGY

BACKGROUND OF THE INVENTION

1. Field of the Invention

The present invention relates generally to milking machines and more specifically to the short milk tube ferrule on the milking claw portion of the milking unit.

2. Setting of the Invention

A major problem for milk producers and regulatory agencies has been the milk residue and other deposits which collect on the interior of the short milk tubes between the teatcup assembly and the claw mechanism. One particular area which is most troublesome is the area between the ferrule of the milking claw and the short milk tube, which is placed some distance over the end of the ferrule. Milk, dirt, debris and microorganisms may collect in this area and remain after washing and sanitizing. The area of contamination is posterior to the ferrule opening, in the overlap between the inside wall of the short milk tube and the outside wall of the ferrule itself. FIGS. 20, 21, and 22 show a prior an form of a ferrule with the contaminated area stippled. This residue will frequently contaminate any milk which subsequently flows through the tubing when the milk phase is resumed. It is generally recognized that the annual loss in milk production due to contamination is very large.

It is well documented that completely washing and sanitizing a milking unit of residual deposits of milk and debris is difficult. This is partly because contamination readily collect between the ferrule and tubing structures. Efforts have been made to develop improved techniques to wash and sanitize the milking units. These efforts include flushing with detergents and sanitizers, improved valve designs as well as alterations in the structure of the milking unit. However, none of the design changes or cleaning methods have been successful in completely washing and sanitizing the space between the short milk tubes and the ferrules. Repetitive milking inevitably causes the formation of a pocket between the ferrule and short milk tube. A pocket develops in almost all designs which utilize a ferrule on the milking claw. This condition is exacerbated by the following:

1. The bending of the short milk tubes over the ferrule when they are inverted from non-milking to milking orientation during the process of attachment.
2. The natural bending of the short milk tubes over the ferrules as the milking unit is in the actual process of milking.
3. The bending of the short milk tubes over the ferrule when they are inverted from milking orientation to the washing and sanitizing orientation.

Since automated washing has not been effective to completely clean the short milk tubes due to the existence of the pockets between the tubes and the ferrules, the only way to remove milk and debris from the pockets is by manual disassembly, cleaning, and reassembly of the short milk tube-ferrule combination. Because this manual cleaning is labor intensive and time consuming, in actuality, it is rarely performed. As a result, dairy producers may suffer financial penalties due to decrease in the quality of the milk.

OBJECTS OF THE INVENTION

Accordingly, the principal object of the present invention is to provide a novel ferrule design which enables the milking unit to be completely washed and sanitized after each milking operation without manual disassembly.

Another object is to provide a ferrule which enables the complete removal or flushing of milk and debris from the pockets which are formed between the short milk tubes and the ferrule of the milking claw.

Another object of the invention is to provide a methodology to increase the quality of milk produced by the dairy industry.

A still further object of the invention is to provide a methodology to prevent financial loss to the dairy producer as a result of lowering the quality of milk.

A further object of the invention is to provide a novel ferrule, designed to reduce the necessity for manual disassembly and cleaning after each milking.

These and still further objects will become apparent hereinafter.

SUMMARY OF THE INVENTION

The present invention provides a simple and cost effective means for a more thorough washing and sanitizing of milking units and removing of debris from the short milk tube-ferrule pockets without the need for removal or replacement of the short milk tubes or teatcup assembly. An aperture is located near the tip of the ferrule of the milking claw, adjacent to the potentially contaminated pocket. This aperture particularly diverts the washing and sanitizing solutions toward and through the pocket during forward or reverse circulation. This turbulence aids in the removal of the contamination and allows a more thorough washing and sanitizing. It appears that the aperture causes a series of eddy currents formed by a divergence from laminar flow. Eddy current in this context means a series of circulating flow patterns. Such flow may be the result of the difference in pressure between the pressure in the short milk tube and the pressure in the collecting area of the claw; known as a venturi effect.

The present invention consists of an improved milking claw ferrule, which is comprised of a tube-like body, attached at one end to a base, and having, at the other end, a main opening and an aperture. The aperture is designed to cause removal of debris from a pocket formed between the ferrule and the interior of the wall of the short milk tube.

DESCRIPTION OF THE DRAWINGS

FIG. 18 is a side elevational view of a third embodiment of the milking claw ferrule of the present invention, FIG. 19 is a top view of the third embodiment, FIG. 20 is a side elevational view of a ferrule of the prior an design (without the aperture of this invention) showing the debris accumulation area as stippled, FIG. 21 is a top view of the prior art design of the ferrule (without the aperture of this invention), and FIG. 22 is a bottom view of the prior art design of the ferrule (without the aperture of this invention) showing the debris accumulation as stippled.

DETAILED DESCRIPTION OF THE INVENTION

Figure 1:
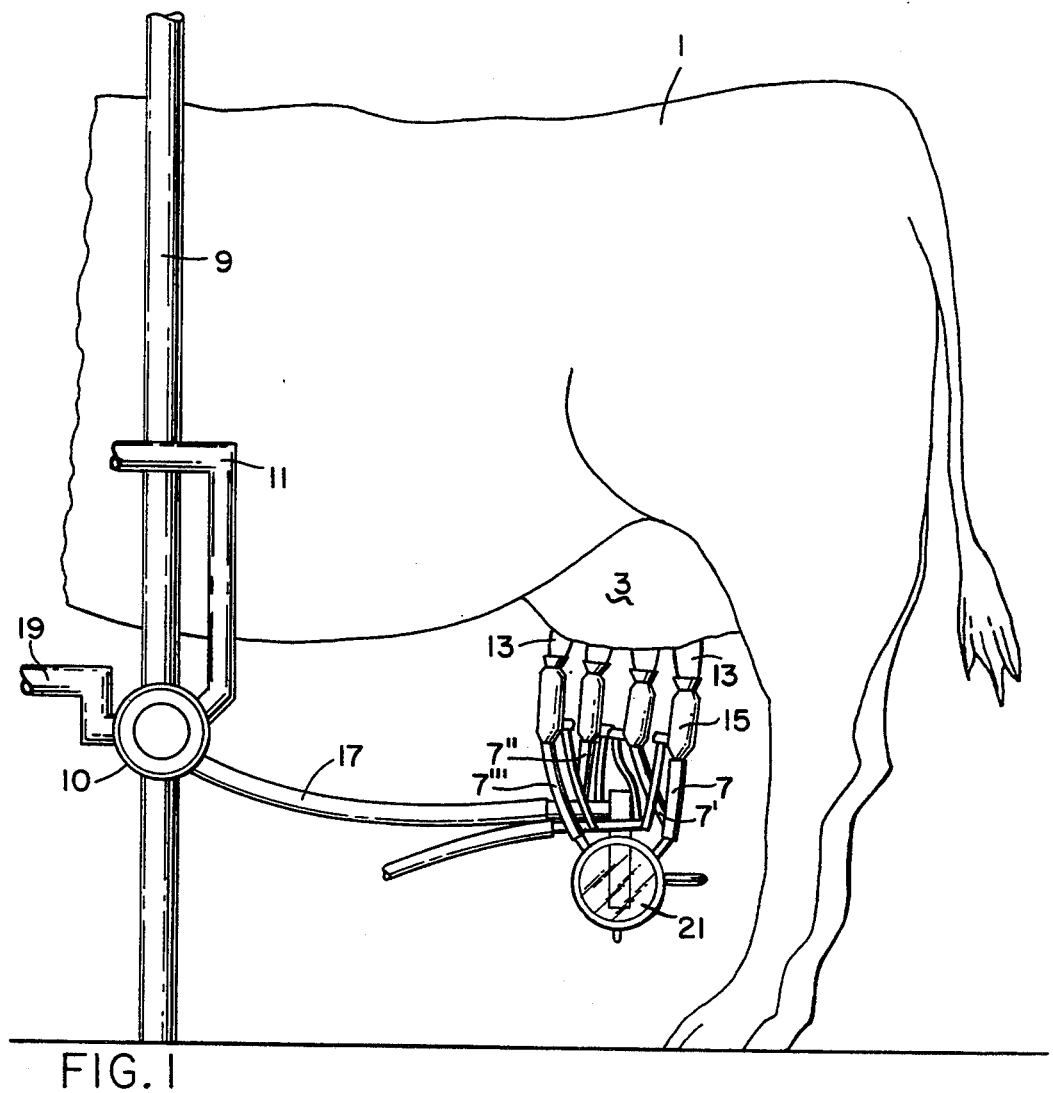
FIG. 1 is a front elevational view of a conventional milking machine, into which the present invention is designed to be incorporated. It is understood that this invention would apply to all types of milking claw designs, for the specific purpose of milk removal from mammals where milk harvesting is customary or possible.

Referring now to the drawings, FIG. 1 shows one embodiment of a typical milking system in which the present invention is designed to be incorporated. Where necessary, pan numbers will be printed, double-primed, etc., to designate identical but separate pans. The milking unit includes a milking claw 21, short milk tubes (7, 7′, 7″, 7″′), which are attached to inflations 15, which in turn are attached to the teats 13 of the utter 3 of the cow 1. One end of the long milk hose 17 is connected to the milking claw 21 and the other end is connected to the milk line 10.

Figure 2:
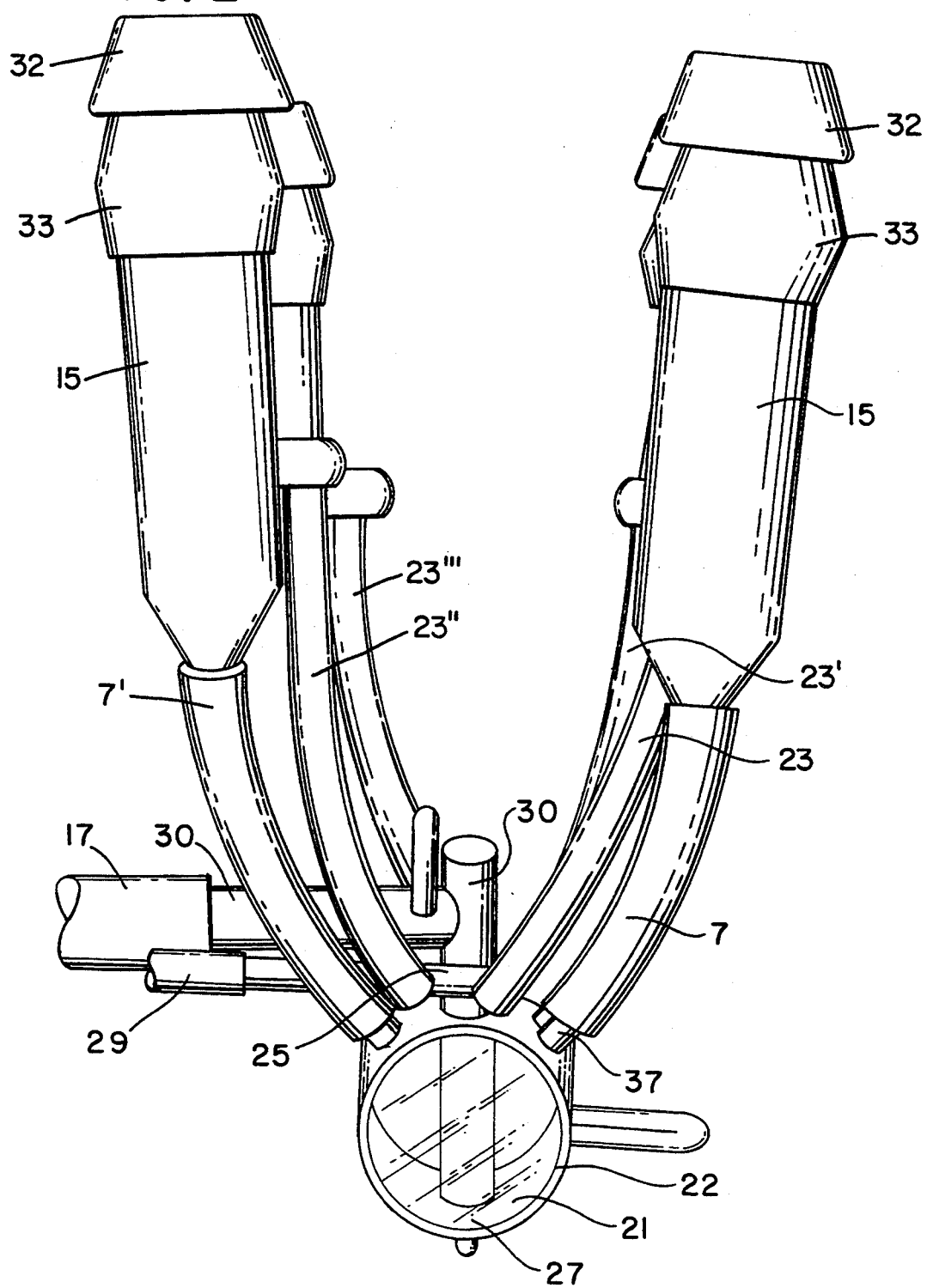
FIG. 2 is a side elevational view of a milking claw of the present invention and associated tubing in a milking orientation.

FIG. 2 is an enlarged view of the milking claw 21 in the milking orientation. The short air tubes (23, 23′, 23″, 23 ″′) lead from the pulsation chambers in the teatcup assembly to an airfork 25 on the claw 21. The long air hose 29 is connected to the airfork 25 and to a source of alternating (ambient to system vacuum) impulses to induce and maintain proper milk flow. The milk claw 21 includes a plurality of ferrules 37 and a rigid milk outlet 30. The ferrules 37 are positioned in the body 22 of the claw 21 and operatively connected to the main chamber 27 and to the short milk tubes 7.

Figure 3:
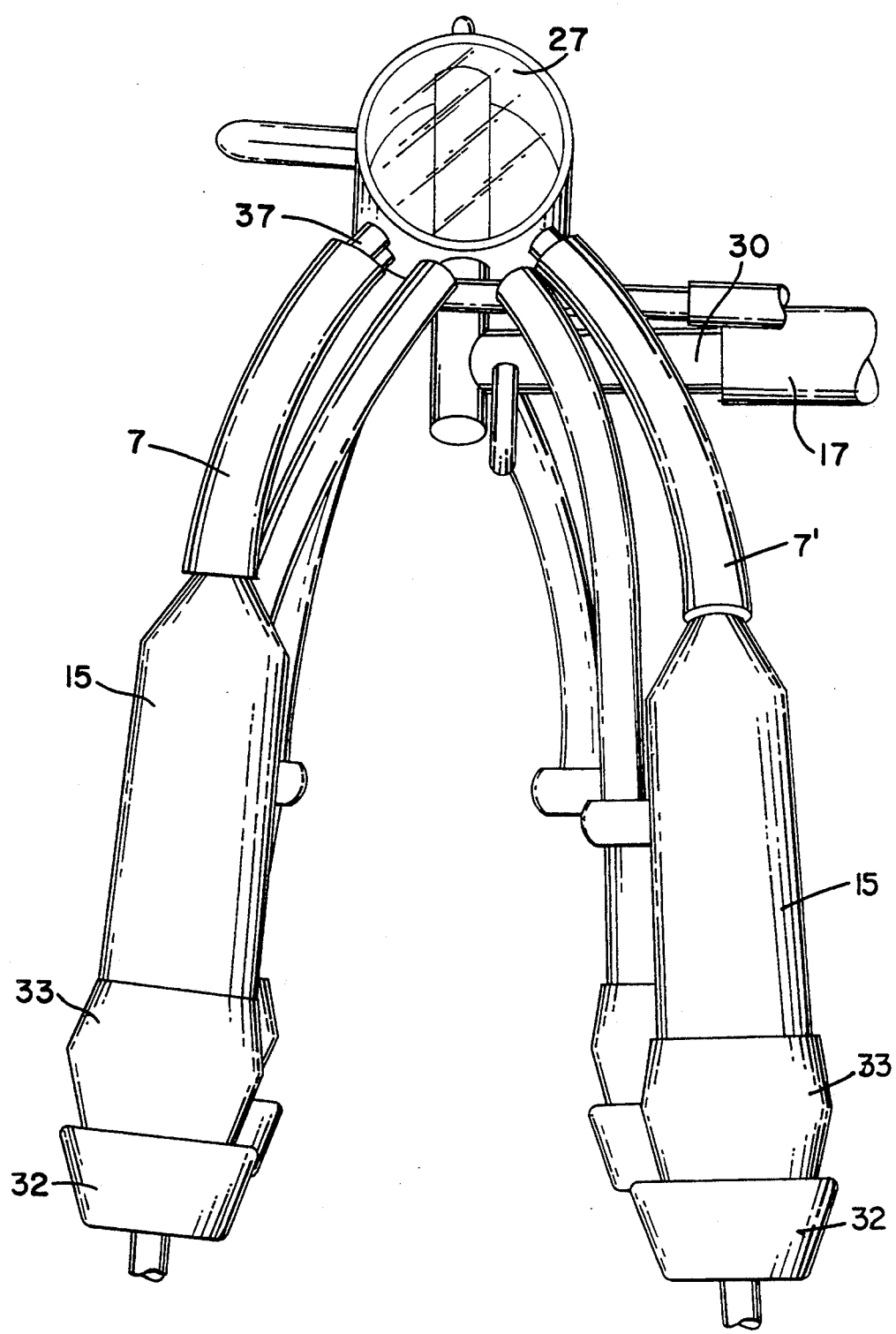
FIG. 3 is a side elevational view of the milking claw and short milk tube in a washing and sanitizing orientation.

FIG. 3 shows the milking claw in the washing or sanitizing orientation. In this orientation, washing and sanitizing solutions can be circulated through wash cups 32 which are attached to the teatcup assemblies 33, through the inflations 15 and the short milk tubes 7 to clean the insides of the assembly. Solutions continue to flow through the milk entry port 30 in the milking claw 27 into the long milk hose 17. In some systems, the circulation process occurs in the reverse of the aforementioned sequence.

Figure 4:
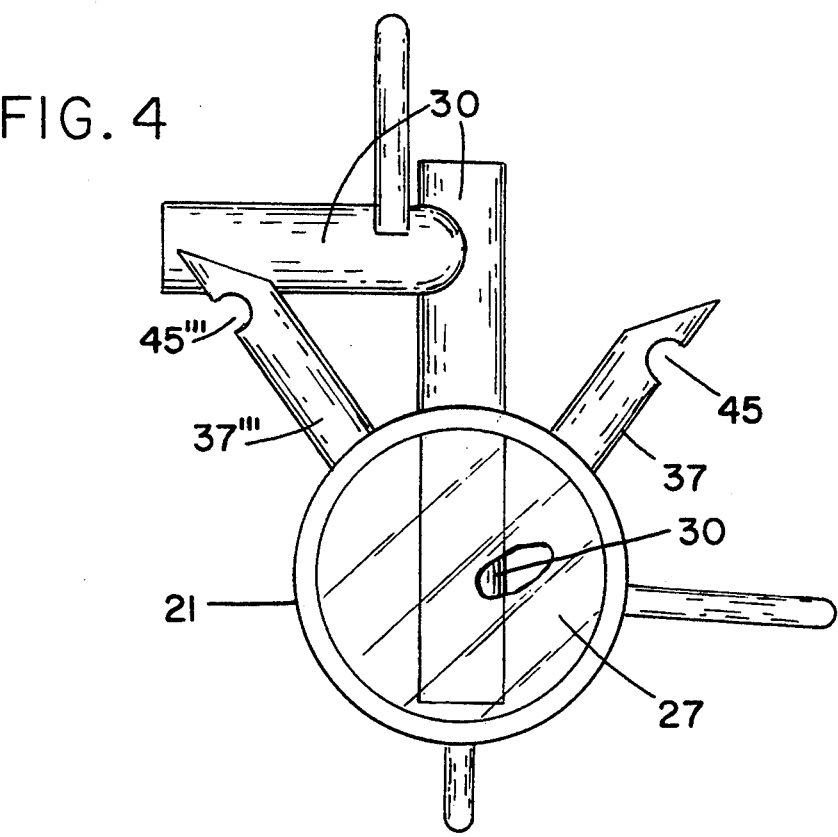
FIG. 4 is a side elevational view of a milking claw embodying the principles of the present invention, without the short milking tubes.
Figure 5:
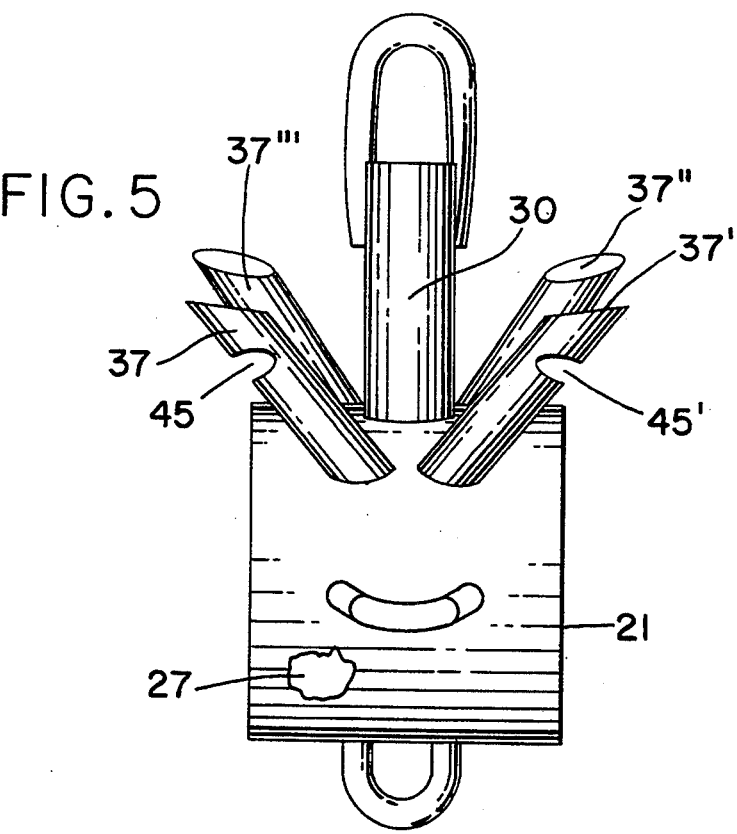
FIG. 5 is a rear elevational view of a milking claw embodying the principles of the present invention, without the short milking tubes.
Figure 6:
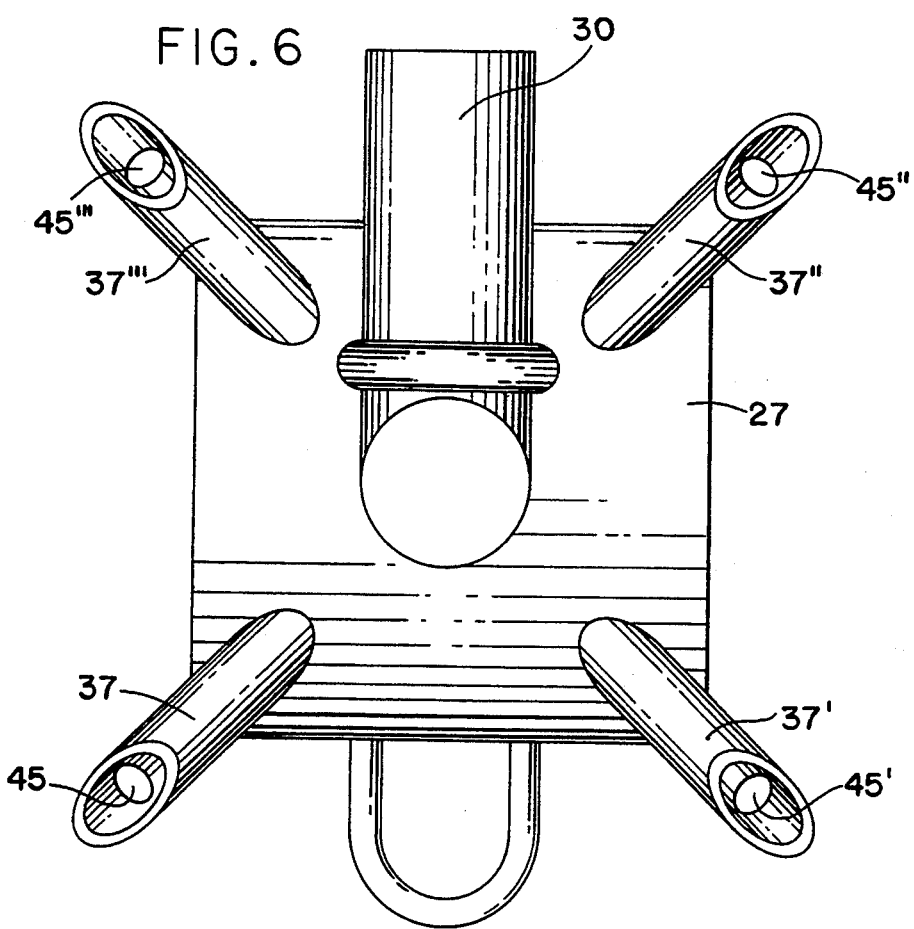
FIG. 6 is a top plan view of the milking claw without the short milking tubes.

FIGS. 4, 5, and 6 show side, rear, and top views, respectively, of a commercially available milking claw, without any tubes attached, and modified in accordance with the preferred embodiment of the present invention. More specifically, the modification involves forming an aperture 45, 45′, 45″, 45″′ in each of the ferrules 37, 37′, 37″, 37″′.

Figure 7:
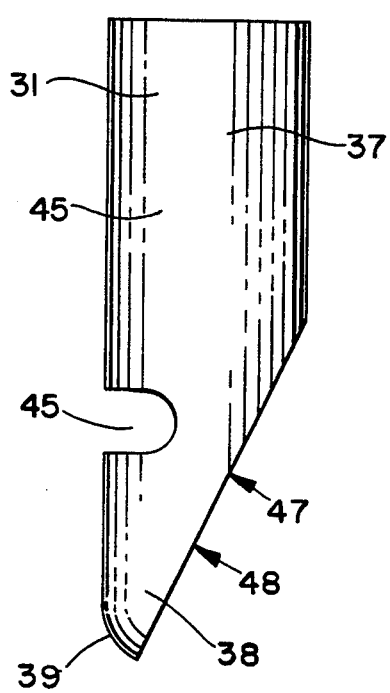
FIG. 7 is a side elevational view of the milking claw ferrule incorporating a lateral aperture and embodying the principles of the present invention.
Figure 8:
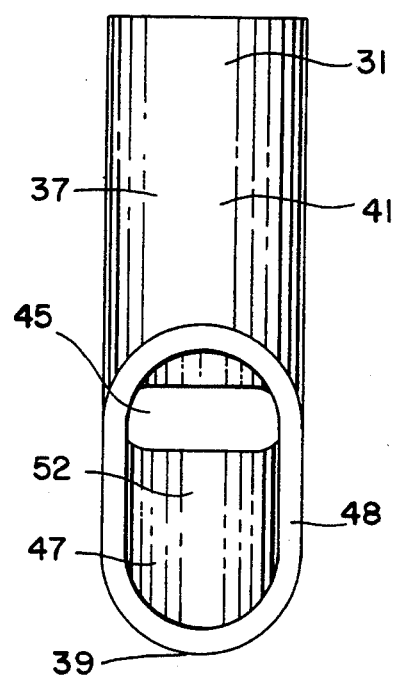
FIG. 8 is a top view of the milking claw ferrule incorporating a lateral aperture and embodying the principles of the present invention.

FIGS. 7 and 8 show a milking claw ferrule 37 separated from the milking claw 21. The ferrule 37 is made of a cylindrical tube 41, and a first end 31 which is attachable to the housing 22 of the claw 21. The ferrule 37 is fixed to the milking claw by welding. A second end 39 has an outlet opening 47 being defined by an edge 48 at an acute angle to the longitudinal axis 38 so that a portion of the wall 52 faces the inlet opening 47. Note that wall portion 52 is part of tube 41. The wall portion 52 has at least one aperture 45, which faces the outlet opening 47. The short milk tubes 7 are applied over the outside of the second end 39 and forced along the outside length of the ferrule until a prescribed placement is reached. FIG. 8 shows the same ferrule as shown in FIG. 7, but FIG. 8 is a view looking down on the ferrule and into the opening 47. The aperture 45 and wall portion 52 can be seen through the opening 47.

Figure 9:
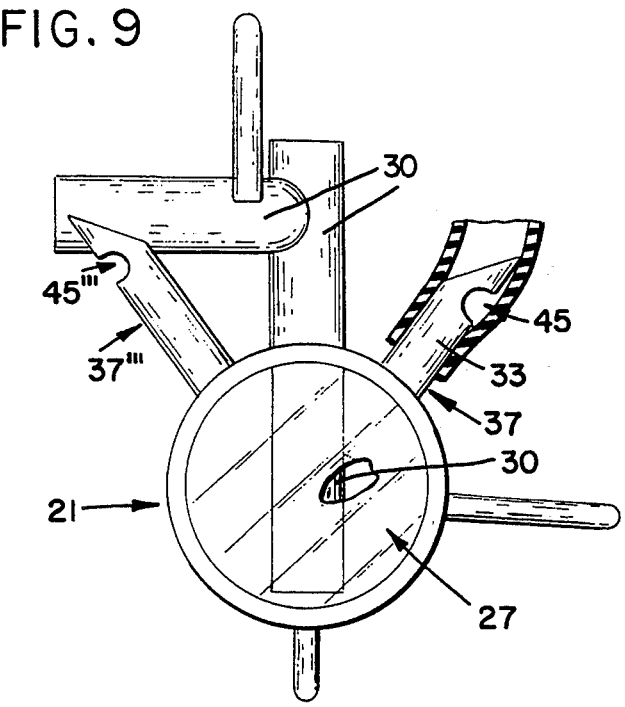
FIG. 9 is a side elevational view of a milking claw with a ferrule embodying the principles of the present invention, showing the short milk tube, in section, on the ferrule and in the milking position.

FIG. 9 shows a side view of a milking claw in a milking orientation. Two of the four ferrules 37 and 37″′ are shown. One ferrule 33 is encased in the sectioned end of a short milk tube 7.

Figure 10:
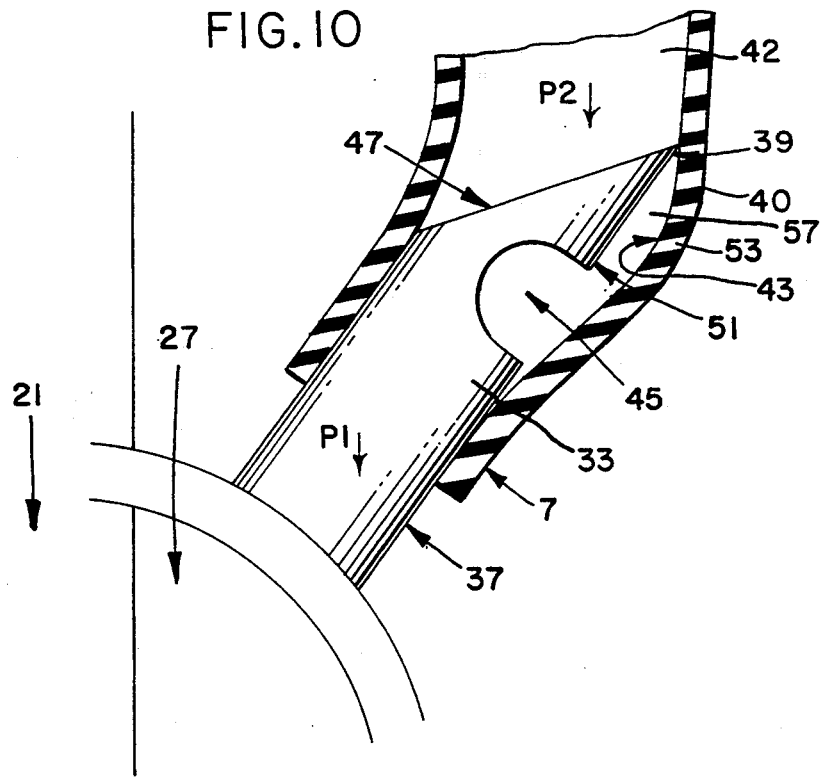
FIG. 10 is a close-up view of the ferrule in FIG. 9.
Figure 15:
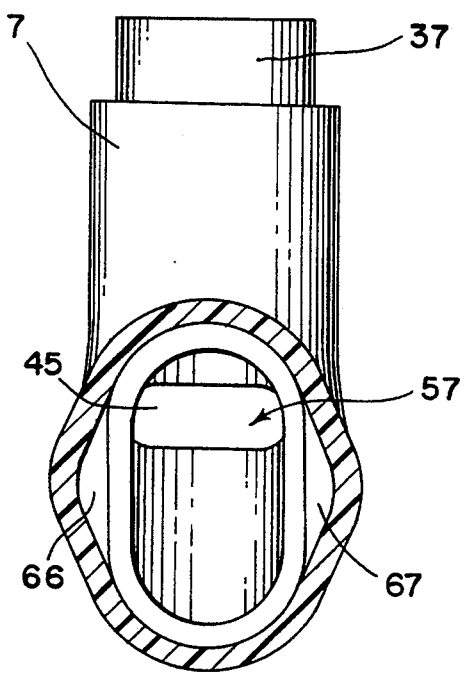
FIG. 15 is a view of the ferrule and incorporated aperture with a cross-sectional view of the attached short milk tube depicting the pockets created by bending stress on the short milk tube.

FIG. 10 shows a close-up view of an outwardly and upwardly disposed branch unit 33 made up of a ferrule 37 and short milk tube 7 (cross-sectional). The milking claw 21 of the milking unit in a milking orientation. When the milking claw is disposed in the milking orientation, the ferrules 37 extend upwardly. The second end 39 of the ferrule fits snugly within the lumen 42 of the short milk tube 7. Milk flow proceeds from the inflations (not shown), through a pressure area P2 in the tube and through the ferrule opening 47 to a lower pressure area P1 in the ferrule 37 and milking claw 21. In the milking orientation, the short milk tube forms a bend as indicated by the reference numeral 53. The region of the short milk tube around the ferrule outer tip 40 is severely angularly strained and distorted because the tubes are holding the weight of the claw. This causes a separation and therefore a debris pocket 57 to form between the outer surface of the ferrule and the inner surface 51 of the short milk tube 7. The debris pocket encircles the outer surface of the extended tip of the ferrule and opens into and communicates with the lumen of the tube through openings 66 and 67, best shown in FIG. 15. FIG. 15 shows a view looking into the ferrule opening 47, with a cross-sectional cut of the short milk tube 7 to show the distortions and short milk tube-ferrule separation that causes openings 66 and 67 to form debris pocket 57. Note that the pocket 57 could be continuous from one side 66, around the bottom or back of the ferrule, to the other side 67. Contamination can enter the pocket 57 through the pocket openings 66 and 67.

When the aperture 45 is not formed in the wall of the ferrule, stale milk and other debris accumulate on the outer surface 51 of the ferrule 37. The area of major accumulation is shown as stippled in FIGS. 20, 21, and 22. This area approximates the part of the ferrule wall that defines the debris pocket 57. The presence of an aperture 45 of the present invention causes milk flow through the pocket and essentially eliminates accumulation in the debris pocket.

Figure 11:
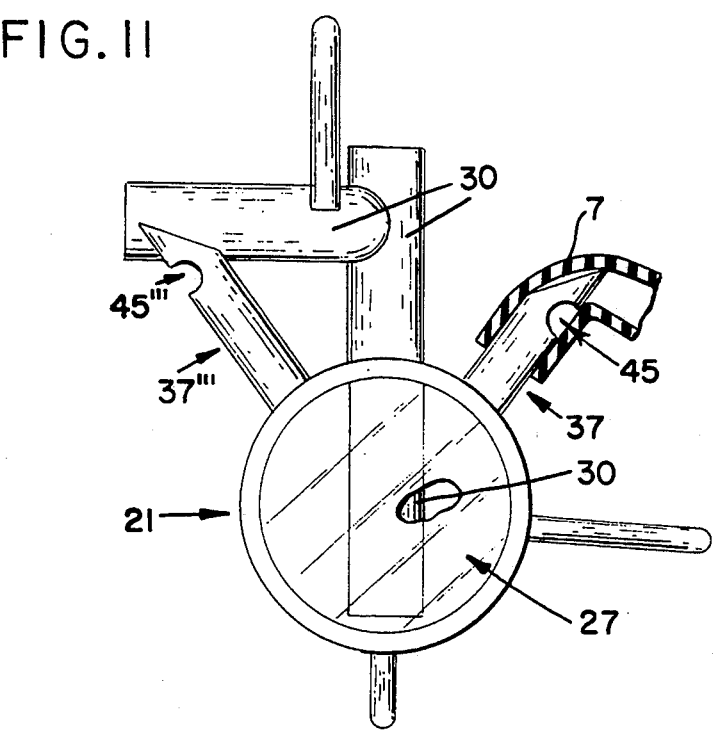
FIG. 11 is a side elevational view of a milking claw with a ferrule embodying the principles of the present invention, showing the short milk tube, in section, on the ferrule and in the between-milking position, with the claw in the milking position and the short milk tube hanging down.
Figure 12:
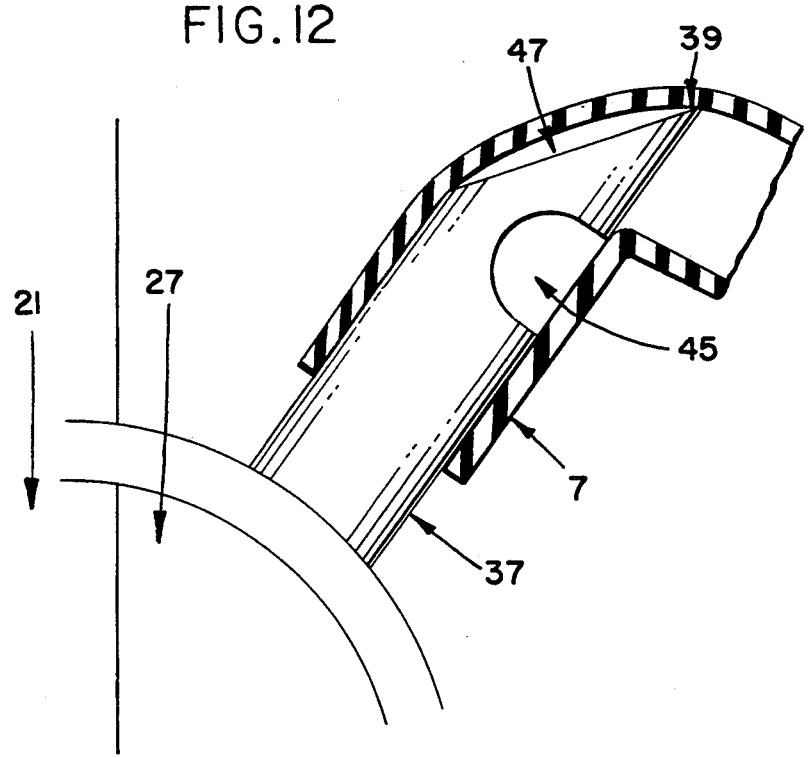
FIG. 12 is a close-up view of the ferrule in FIG. 11.

FIG. 11 is similar to FIG. 9 in that the milking claw 21 is in the milking orientation. However, FIG. 11 represents the orientation in which the teatcup assembly 15 is removed from the cow and the teatcup and the short milk tube 7 are allowed to hang down over the ferrule 37. As shown in more detail in FIG. 12, the weight of the teatcup assembly and the short milk tube 7, and the shape of the short milk tube 7 open up the pocket so that the pocket becomes an open crevice. This crevice provides an additional means by which sediment and milk residue can enter and remain in the pocket, but this accumulation is avoided by the presence of the aperture. In the preferred embodiment design, the aperture is positioned so that, when the short milk tube is in this position, the inside wall of the short milk tube seals the aperture, thus maintaining the reduced pressure inside the claw.

Figure 13:
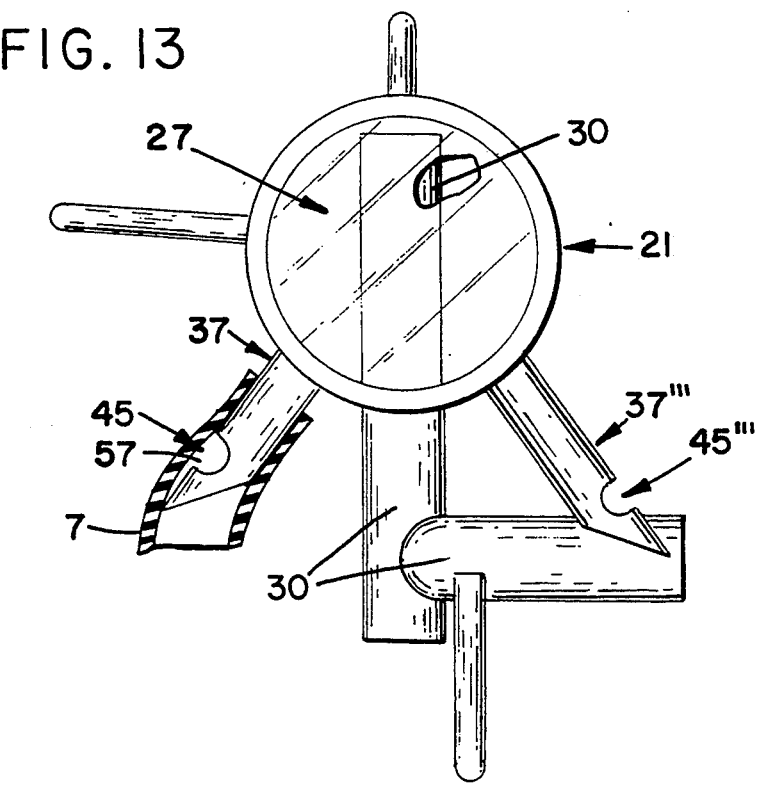
FIG. 13 is a side view of a milking claw with a ferrule embodying the principles of the present invention, showing the short milk tube, in section, on the ferrule and in the washing and sanitizing position, with the claw inverted and the short milk tube hanging down.
Figure 14:
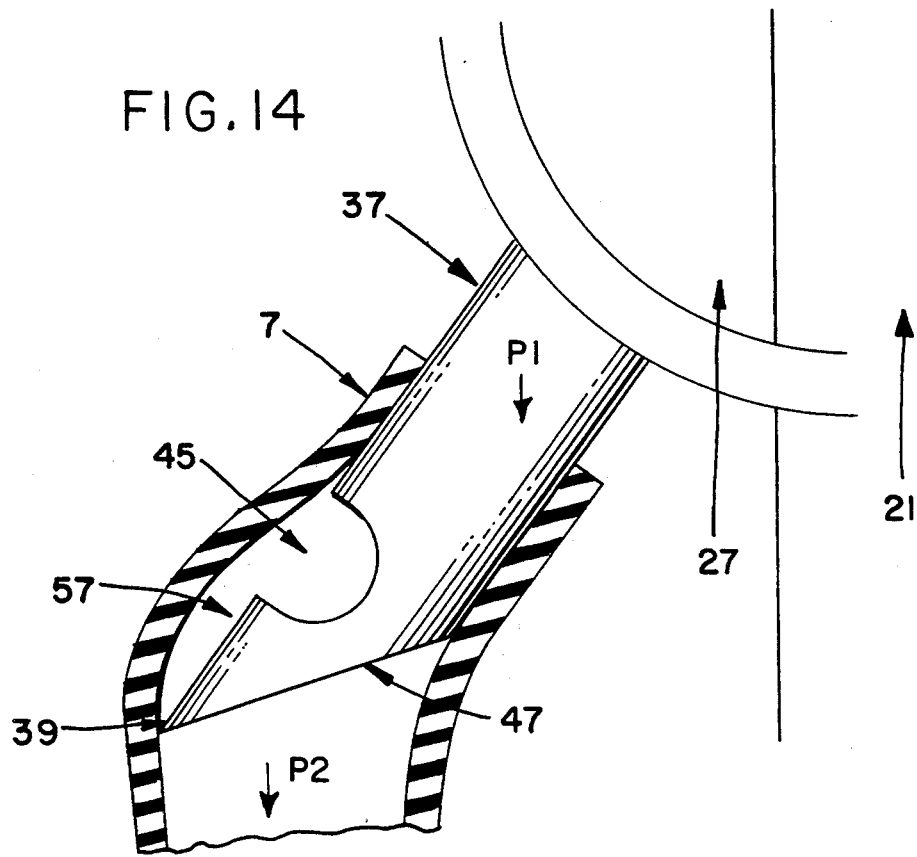
FIG. 14 is a close-up view of the ferrule in FIG. 13.

FIG. 13 shows the milk claw 21 upside down with the short milk tube 7 hanging down. The aperture 45 of the present invention forms a passageway between the debris pocket 57 and the interior of the ferrule 37. This is the orientation of the milking claw when it is flushed out with washing and sanitizing solutions. As the washing and sanitizing solutions flow through the short milk tube 7 and through the ferrule, the flow is automatically diverted through the aperture and pocket, thereby constantly washing the debris from the pocket.

Figure 16:
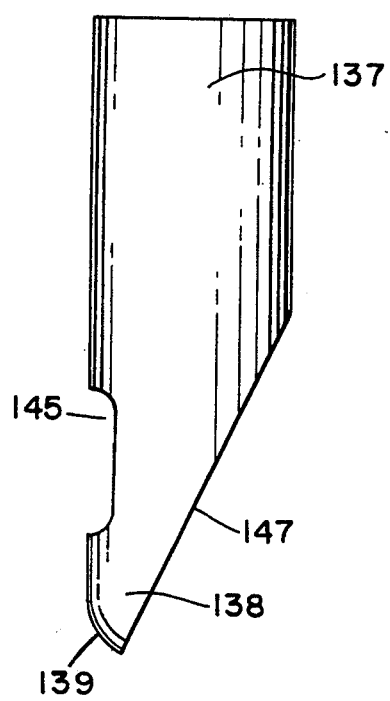
FIG. 16 is a side elevational view of a second embodiment of a milking claw ferrule of the present invention.
Figure 17:
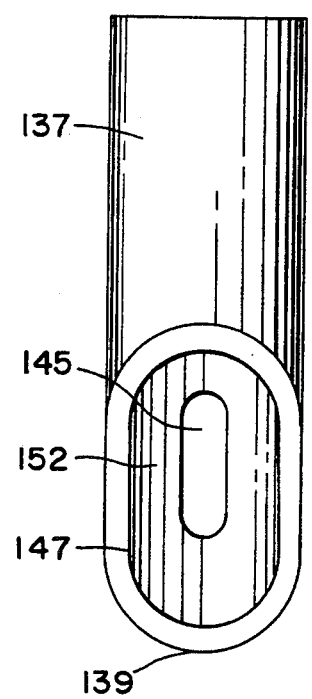
FIG. 17 is a top view of the second embodiment.

FIGS. 16 and 17 show the same ferrule as in FIG. 7 and 8, but with a variation in the orientation of the aperture 145. Whereas long axis of the orientation in FIG. 7 and 8 is lateral (perpendicular to the ferrule axis), the long axis in FIG. 16 and 17 is longitudinal (parallel to the ferrule axis).

FIGS. 18 and 19 show the same ferrule as in FIGS. 7 and 8, but with a variation in the design of aperture 245 and 246. The ferrule apertures 245 and 246 are similar in position to the aperture 45 except that they are separated by a bridge 250. The bridge 250 provides structural reinforcement of the ferrule for situations where a slot-type aperture, like aperture 45, may unacceptably weaken the ferrule. This weakening of the ferrule is primarily of concern if the claw falls off the animal and is stepped on by the animal. The pocket cleaning effects of the eddy currents caused by the apertures are not significantly reduced by the bridge 250.

The action by which the aperture 45 substantially eliminates accumulation of debris in the pocket 57 occurs throughout the milking and cleaning process. During the milking process, the flow of milk through the openings 66 and 67, pocket 57 and the aperture 45, and turbulence of eddy current around those structures, constantly flushes out accumulation with fresh milk. This eliminates the long residence time that debris spends in the pocket and thereby eliminates build up of debris in the pocket which, in turn, results in little or no bacteria multiplication. This same flushing effect allows the washing and sanitizing solutions of the normal cleaning cycle to effectively clean out debris from the pocket far more effectively than can be accomplished without the aperture 45. Finally, when the milking claw is in the milking orientation with the short milk tube 7 hanging down, the aperture 45 tends to neutralize physical forces that might draw milk up into the pocket 45, thereby reducing potential accumulations in the pocket.

Further modifications of the invention herein disclosed will occur to persons skilled in the art and all such modifications are deemed to be within the scope of the invention as defined by the appended claims.

We claim:

1. A milking claw ferrule and short milk line structure comprising:
   (a) a tubular ferrule wall with an outside surface, a lumen, and a longitudinal axis;
   (b) a first ferrule end which has a first opening:
   (c) a second ferrule end which has a second opening opposite said first opening;
   (d) a short milk line positioned over the second ferrule end and forming a debris pocket between the milk line and the outside surface of the ferrule; and
   (e) an aperture through said ferrule wall adjacent to said second opening and communicating between the lumen of the ferrule and the pocket.

2. A milking claw ferrule as recited in claim 1, in which the shape of the aperture has a long axis parallel to the ferrule axis.

3. A milking claw ferrule as recited in claim 1, wherein the aperture is positioned and adapted to redirect a portion of fluid flowing through the ferrule through the pocket to flush the pocket.

4. A method of removing debris from a debris pocket between a milking claw ferrule which has a tubular wall and a short milk line comprising:
   (a) forming an aperture through the wall of the ferrule to the pocket; and
   (b) flushing the debris pocket by causing fluid to pass through the aperture to the pocket.

5. A milking system ferrule and short milk line structure comprising:
   (a) a tubular ferrule wall with an outside surface, a lumen, and a longitudinal axis;
   (b) a first ferrule end which has a first opening;
   (c) a second ferrule end which has a second opening opposite said first opening;
   (d) a short milk line positioned over the second ferrule end and forming a debris pocket between the milk line and the outside surface of the ferrule; and
   (e) an aperture through said ferrule wall adjacent to said second opening and communicating between the lumen of the ferrule and the pocket.

6. A milking system ferrule as recited in claim 5, in which the shape of the aperture has a long axis parallel to the ferrule axis.

7. A milking system ferrule as recited in claim 5, wherein the aperture is positioned and adapted to redirect a portion of fluid flowing through the ferrule through the pocket to flush the pocket.

8. A milking claw ferrule, comprising:
   (a) a tubular cylindrical wall which has a central longitudinal axis;
   (b) a first end which has a first opening; and
   (c) a second end which has a second opening, said second opening being defined by an edge which is at an acute angle to said axis so that a portion of said wall faces said second opening, said wall portion having at least one aperture with a long axis parallel to the ferrule axis and which faces said second opening and extends through the wall.

9. A milking claw comprising:
(a) a housing with a chamber; and
(b) a ferrule which has a tubular cylindrical wall with a central longitudinal axis, said ferrule having a first end which is fixed to said housing, a first opening at said first end which is operatively connected to said chamber, a second end which has a second opening, said second opening being defined by an edge which is at an acute angle to said axis so that a portion of said wall faces said second opening, said wall portion having at least one aperture with a long axis parallel to the ferrule axis and which faces said second opening.

10. A milking claw ferrule comprising:
(a) a tubular cylindrical wall which has a central longitudinal axis;
(b) a first end which has a first opening; and
(c) a second end which has a second opening, said second opening being defined by an edge which is at an acute angle to said axis so that a portion of said wall faces said second opening, said wall portion having at least one aperture with a long axis perpendicular of the ferrule axis, and which faces said second opening and which extends through the wall.

11. A milking claw ferrule comprising:
(a) a tubular wall;
(b) a first end which has a first opening;
(c) a second end which has a second opening opposite said first opening; and
(d) an aperture with a long axis perpendicular to the ferrule axis, and which is in said wall adjacent to said second opening.

12. A milking claw comprising:
(a) a housing with a chamber; and
(b) a ferrule which has a tubular cylindrical wall with a central longitudinal axis, said ferrule having a first end which is fixed to said housing, a first opening at said first end which is operatively connected to said chamber, a second end which has a second opening, said second opening being defined by an edge which is at an acute angle to said axis so that a portion of said wall faces said second opening, said wall portion having at least one aperture with a long axis perpendicular to the ferrule axis, and which faces said second opening.

13. A milking claw ferrule and short milk line structure comprising:
(a) a tubular ferrule wall with an outside surface, a lumen, and a longitudinal axis;
(b) a first ferrule end which has a first opening;
(c) a second ferrule end which has a second opening opposite said first opening;
(d) a short milk line positioned over the second ferrule end and forming a debris pocket between the milk line and the outside surface of the ferrule; and
(e) an aperture with a long axis perpendicular to the ferrule axis, and which is in said ferrule wall adjacent to said second opening and communicating between the lumen of the ferrule and the pocket.

14. A milking system ferrule and short milk line structure comprising:
(a) a tubular ferrule wall with an outside surface, a lumen, and a longitudinal axis;
(b) a first ferrule end which has a first opening;
(c) a second ferrule end which has a second opening opposite said first opening;
(d) a short milk line positioned over the second ferrule end and forming a debris pocket between the milk line and the outside surface of the ferrule; and
(e) an aperture with a long axis perpendicular to the ferrule axis, and which is in said ferrule wall adjacent to said second opening and communicating between the lumen of the ferrule and the pocket.

15. A milking system ferrule and short milk line structure as recited in claim 14, wherein, when the milk line is in an inactive position, it seals the aperture.

16. A milking claw ferrule comprising:
(a) a tubular wall which has a central longitudinal axis;
(b) a first end which has a first opening;
(c) a second end which has a second opening opposite said first opening; and
(d) an aperture through said wall adjacent to said second end, said aperture having a long axis which is parallel to said central longitudinal axis.

17. A milking claw ferrule comprising:
(a) a tubular wall which has a central longitudinal axis;
(b) a first end which has a first opening;
(c) a second end which has a second opening opposite said first opening; and
(d) at least two apertures through said wall adjacent to said second end, and said apertures being adjacent to each other.

18. A liquid gathering manifold having a ferrule and a tube, said ferrule being surrounded by said tube wherein a pocket is formed between said ferrule and said tube, said ferrule having a tubular wall which has an aperture to provide for communication between the interior of said ferrule and said pocket, said aperture being adapted to cause liquid, which flows through said ferrule, to flush out said pocket.

* * * * *